US008413612B2

(12) United States Patent  
Smith

(10) Patent No.: US 8,413,612 B2
(45) Date of Patent: Apr. 9, 2013

(54) BIG DOG BALL LOG

(75) Inventor: Matthew David Smith, Whitefish, MT (US)

(73) Assignee: Matthew D. Smith, Whitefish, MT (US)

( * ) Notice: Subject to any disclaimer, the term of this patent is extended or adjusted under 35 U.S.C. 154(b) by 0 days.

(21) Appl. No.: 12/781,798

(22) Filed: May 17, 2010

(65) Prior Publication Data

US 2011/0277695 A1 Nov. 17, 2011

(51) Int. Cl.
*A01K 29/00* (2006.01)

(52) U.S. Cl.
USPC .......................................... 119/709; 119/707

(58) Field of Classification Search ................ 119/702, 119/707–711; D30/160; 473/575, 576, 280; 63/38, 4, 9, 37; 59/2, 80, 81
See application file for complete search history.

(56) References Cited

U.S. PATENT DOCUMENTS

| 96,812 | A | * | 11/1869 | Itschner | 119/712 |
| 849,164 | A | * | 4/1907 | Roede | 63/38 |
| 1,177,505 | A | * | 3/1916 | Fleming | 403/182 |
| 1,325,651 | A | * | 12/1919 | Pajeau | 446/382 |
| 1,559,320 | A | * | 10/1925 | Hirsh | 132/323 |
| 1,694,044 | A | * | 12/1928 | Thompson | 482/87 |
| 2,408,160 | A | * | 9/1946 | Brunner | 273/440 |
| 3,157,962 | A | * | 11/1964 | Bonnelly | 446/247 |
| 3,744,798 | A | * | 7/1973 | Schmid | 273/159 |
| RE34,208 | E | * | 3/1993 | Shaw | 446/75 |
| 5,282,777 | A | * | 2/1994 | Myers | 482/122 |
| 5,879,251 | A | * | 3/1999 | Rose | 473/576 |
| 5,961,406 | A | * | 10/1999 | Hass | 473/576 |
| 6,623,328 | B1 | * | 9/2003 | Theel | 446/369 |
| 6,676,481 | B2 | * | 1/2004 | Klaus et al. | 446/489 |
| 6,837,836 | B2 | * | 1/2005 | Huang | 482/126 |
| D505,233 | S | * | 5/2005 | Viola | D30/160 |
| 6,889,982 | B1 | * | 5/2005 | Gove | 273/343 |
| 6,901,771 | B2 | * | 6/2005 | Ooide | 63/26 |
| 6,981,471 | B1 | * | 1/2006 | Dubinins et al. | 119/710 |
| 7,219,626 | B2 | * | 5/2007 | Hurwitz | 119/707 |
| 7,409,763 | B2 | * | 8/2008 | Pratt | 29/896.41 |
| 7,878,151 | B2 | * | 2/2011 | Tsengas | 119/707 |
| 8,082,753 | B1 | * | 12/2011 | Alvarez et al. | 63/1.14 |
| 2002/0095952 | A1 | * | 7/2002 | Kelly | 63/3 |
| 2002/0148250 | A1 | * | 10/2002 | Pratt | 63/3 |
| 2007/0062461 | A1 | * | 3/2007 | Lubeck | 119/709 |
| 2007/0261441 | A1 | * | 11/2007 | Fouzailov | 63/40 |
| 2008/0018092 | A1 | * | 1/2008 | Zeller et al. | 281/42 |
| 2009/0078214 | A1 | * | 3/2009 | Mann | 119/709 |

* cited by examiner

*Primary Examiner* — Kristen C Hayes
(74) *Attorney, Agent, or Firm* — Craig Bohn

(57) ABSTRACT

A dog toy comprised of a plurality of resilient balls, relatively snugly joined in a linear configuration via an interior connecting member. The connecting member protected from wear by the pressure holding two adjacent balls together resisting the penetration of the teeth of an animal playing with the toy. The toy appearance describable as a ball log.

20 Claims, 3 Drawing Sheets

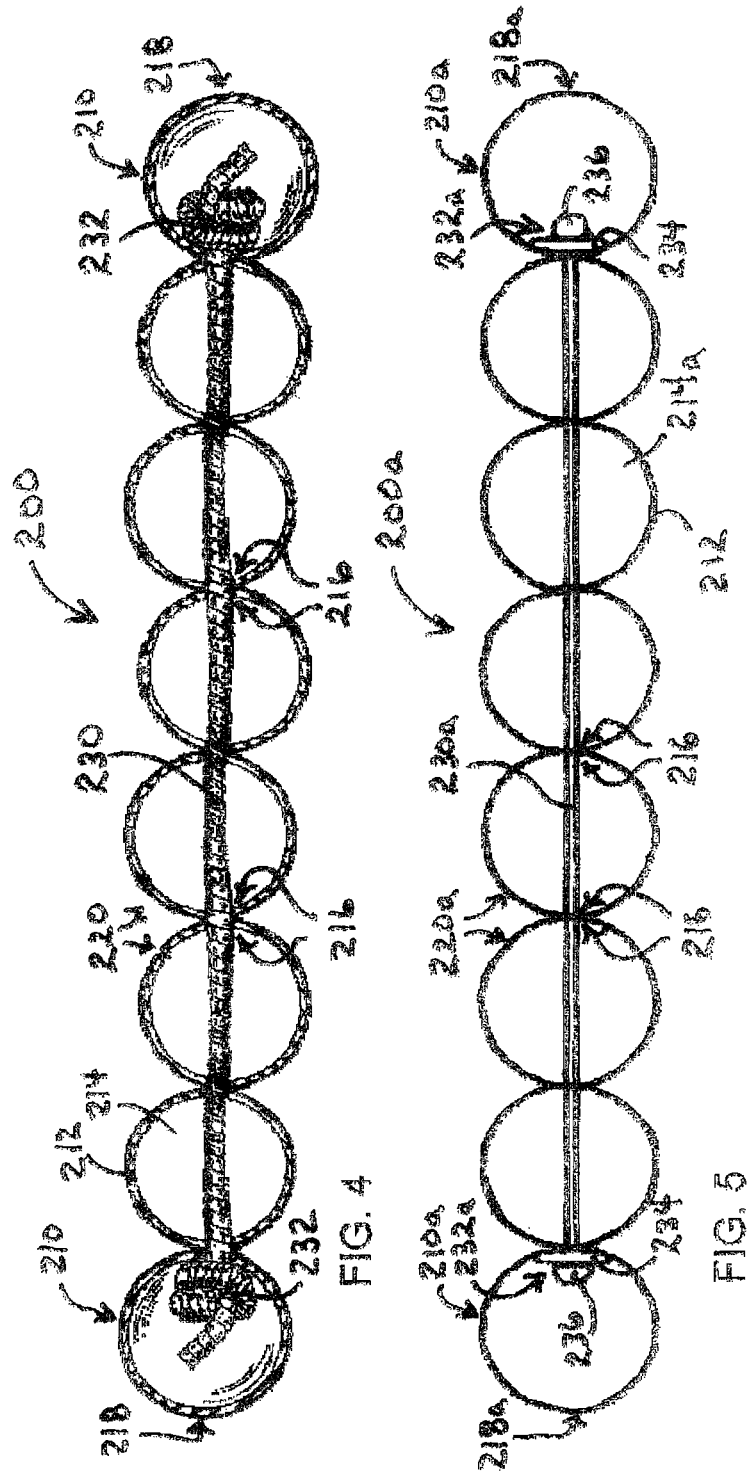

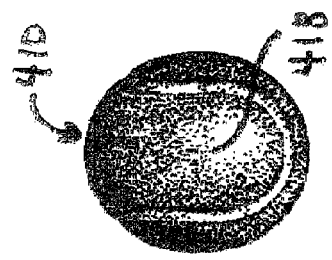
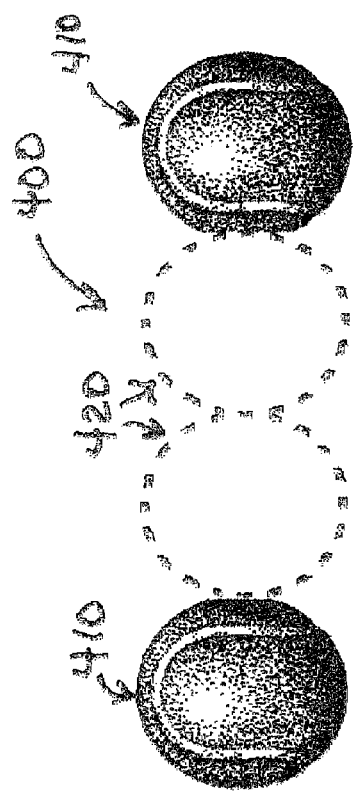
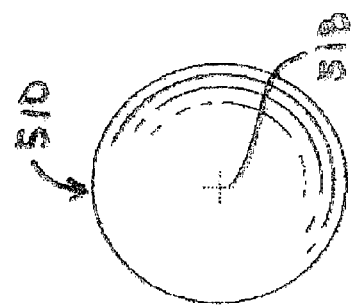
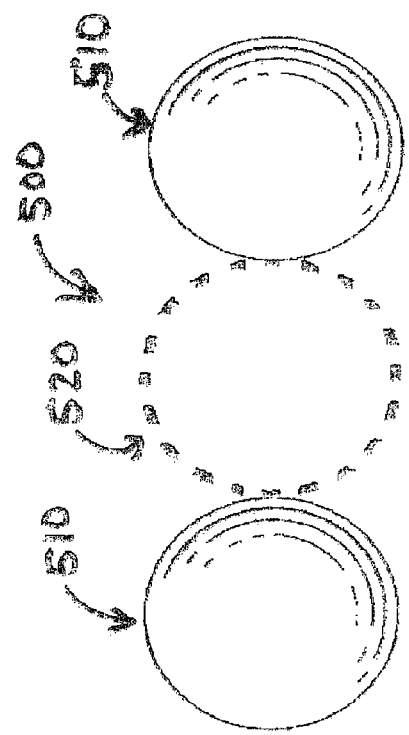

BIG DOG BALL LOG

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

This invention relates in general to toys for pets and, more particularly, to dog toys comprising multiple, closely-connected, resilient balls.

Dog toys provide a means for enjoyment and exercise for dogs (and other pets). As is well known, balls and other pet toys that can bounce, be pounced on, grabbed, and pulled by pet's mouth are very popular. Dogs love chasing and retrieving such bouncing toys and tugging against the opposite pulling of their owners or another dog. While conventional toys of this type are enjoyed by dogs. the toys typically become worn and tattered by a dog's instinct to find weaknesses in the chew item and tear it apart.

Currently, in dog toys with balls, the balls of dog tug toys are attached to their pulling ropes with a portion of the rope exposed. The rope of some pass through holes on opposite sides of the ball and is held by a knot outside the ball, or the rope is looped through the ball and tied, or a knot is formed in the end of the rope and then inserted into the hollow center of a ball through a hole. In each of these instances the rope remains accessible to the dog, and the dog naturally chews at the rope until the rope becomes frayed and tattered.

Accordingly, there is a need for an improved dog toy that protects the toy's integrity over an extended play period, which can be bitten or chewed by a dog for many days and months without being damaged and destroyed. The present invention is a result of research, development, and experimentation concerning the above problems and ways to overcome such problems.

BRIEF DESCRIPTION OF THE DRAWINGS

The invention will be explained in conjunction with an illustrative embodiment shown in the accompanying drawings, in which:

FIG. 4 is a cross-sectional side view of the exemplary embodiment of the device of FIG. 2, cut along a lengthwise axis;

FIG. 5 is a schematic cross-sectional view of an additional alternate exemplary embodiment of the device of FIG. 2, cut along a lengthwise axis;

FIG. 6 is a side elevational view of the ball log of the present design comprised of tennis-ball-like balls; and FIG. 7 is an end elevational view of the ball log of the present design of FIG. 6, and the other end being the same.

FIG. 8 is a side elevational view of the an alternative exemplary embodiment of the ball log of the present design; and FIG. 9 is an end elevational view of the ball log of the present design of FIG. 8, and the other end being the same.

DESCRIPTION OF THE ILLUSTRATED EMBODIMENT

This invention, which will be described in detail below, is an improvement in dog toys of the type having a ball or other biting object for dogs to bite. The present invention overcomes the problems described above.

One aspect of this invention is a dog toy including biting objects having hollow interior cavities and a tough outer surface defining at least one opening into the cavity; and a connective member having an end portion extending into the cavity through the rope opening.

Another aspect of the invention is a dog toy including multiple resilient balls, having hollow interior cavities and tough outer surfaces defining two openings into the cavity through which the connective member may pass, and in the case of an interior ball, extend into the adjacent ball. As such, multiple balls may form a chain structure, where the tough outer surfaces of the balls protect the connective member.

The biting object may have a tennis-ball-like outer surface, and may comprise a tennis ball. Throughout this summary section and elsewhere in this specification, this invention will refer to the biting object as a "ball" or "tennis ball", however, it is to be understood that the invention is not limited in scope by the exact nature of the biting object.

Throughout this summary section and elsewhere in this specification, this invention may be referred to as a "log," which is used as a reference term generally for the entirety of the device, and comes from the general outward structure and appearance of several exemplary embodiments of the device.

As used herein, the term "tennis-ball-like ball" includes not only tennis balls, but any hollow ball or bounceable body that is made of a tough rubber or rubber-like material having a felt or felt-like cover. Such balls and bodies are known to be able to withstand repetitive biting by dogs without incurring significant damage. Likewise, the term "tennis-ball-like" refers to the nature of such material. In addition to its toughness, such material is both compressible and resilient; i.e., it quickly returns to its original shape when no longer in the grip of a dog's mouth. Such toys can function months or longer despite considerable abuse by dogs, especially considering that the less-durable connective member is protected by the tough outer surface of the balls.

As used herein, the term "tough outer surface" means that the material forming the ball, or other biting object, has a toughness character sufficient such that repetitive frequent biting by a typical dog, over an extended period of a month or more, will not puncture the ball or other biting object. Toughness typical of a tennis ball more than satisfies this requirement. A high-quality tennis ball, such as a Wilson® brand tennis ball, has shown to provide greater durability and toy life.

Figure 1:
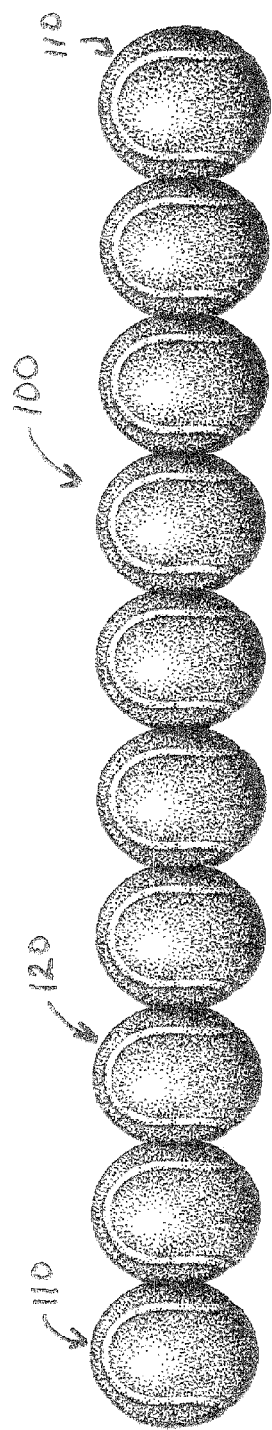
FIG. 1 is an illustration of a side view of an exemplary embodiment of the current device.

Now, referring to FIG. 1, the exemplary embodiment ball log 100 comprising ten biting objects. In the exemplary embodiment the biting objects are balls, and more specifically tennis balls. Ball log 100 comprises two end balls 110 and a series of eight interior balls 120. In the exemplary embodiment the balls are connected snugly, and may be slightly compressed from tension applied by adjacent balls.

Figure 2:
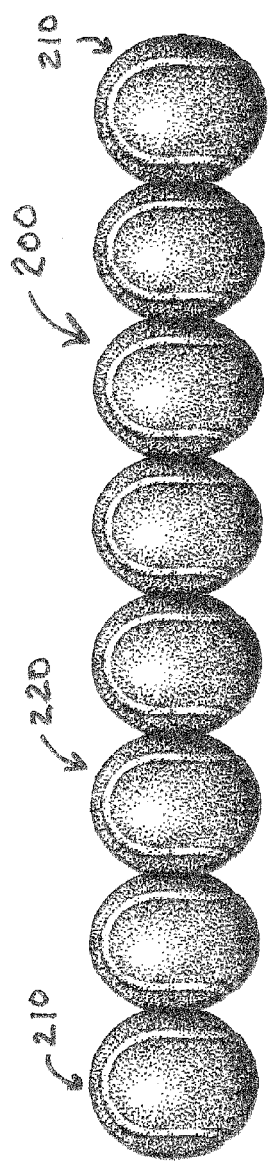
FIG. 2 is an illustration of a side view of an alternate exemplary embodiment.

Now, referring to FIG. 2, the exemplary embodiment ball log 200 comprising eight biting objects. In the exemplary embodiment the biting objects are balls, and more specifically tennis balls. Ball log 200 comprises two end balls 210 and a series of six interior balls 220. In the exemplary embodiment the balls are connected snugly, and may be slightly compressed from tension applied by adjacent balls.

Figure 3:
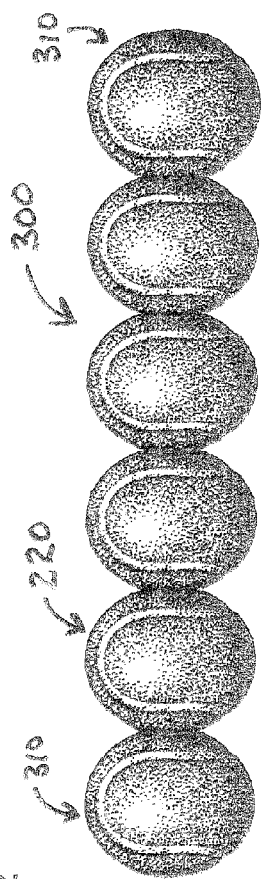
FIG. 3 is an illustration of a side view of an additional alternate exemplary embodiment.

Now, referring to FIG. 3, the exemplary embodiment ball log 300 comprising six biting objects. In the exemplary embodiment the biting objects are balls, and more specifically tennis balls. Ball log 300 comprises two end balls 310 and a series of four interior balls. In the exemplary embodiment the balls are connected snugly, and may be slightly compressed from tension applied by adjacent balls.

Referring generally to FIGS. 1-3, the exemplary embodiments show the balls uniformly oriented, such that the seams of the balls are all uniformly positioned, but this is not necessary to the function of the toy. From the provided exemplary embodiments one may see that the number of interior balls may vary without departing from the invention.

Referring now to FIG. 4, an exemplary embodiment of the device shown in FIG. 2 is shown to depict an exemplary interior construction. The end balls 210 and the interior balls 220 are shown to have a resilient outer surface 212 that forms an interior 214. In the exemplary embodiment, the interior 214 is a void, so that the ball may be described as hollow. Interior balls 220 are shown to have a pair of openings 216, which permit the passage of connective member 230. Each end ball 210 is shown to have at least one similar opening 216. Additionally, the end balls 210 may have an anchor opening 218. In the exemplary embodiment, connective member 230 is secured on each end with anchor 232, which may be a knot. An appropriate knot may actually comprise a number of simple, overhand knots, which collectively form an anchor 232 of adequate size to secure the respective end ball 210 to the adjacent interior ball 220. The length of connective member 230 is chosen to ensure a relatively snug connection between the balls, such that tension between the adjacent ball surfaces 212 inhibit access to the connective member 230. Within this disclosure, "relatively snugly" describes the amount of force between adjacent balls that effectively limits access to the connective member from between the balls, particularly during the vigorous chewing and tugging action of a large dog engaged in active play.

Referring to FIG. 5, an alternate exemplary embodiment of the device shown in FIG. 2 is shown to depict an alternate exemplary interior construction. In the exemplary embodiment, the end balls 210a are secured to the interior balls 220a by a connective member 230a comprising multiple strands. Appropriate material to construct a flexible and relatively non-stretchable connective member 230a may include 3/16th inch clothesline cord, constructed of either or both polyester and polypropylene fibers, which may be twisted or braided. To accommodate connective member 230a, anchor opening 218a may be a pair of roughly ½ inch cuts that intersect at their mid-points at or about a 90 degree angle. Exemplary connective member 230a is shown to be secured at each end by an anchor 232a, comprised of a washer 234, and a securement device 236. Exemplary securement device 236 prevents the ends of the connective member 230a from passing through washer 234 and the ball surface 212a, and out of the ball interior 214a.

In an alternate exemplary embodiment the connective member may be a rivet, bolt, or other relatively short connector that would anchor one end within the void of one ball and the other end within the void of an adjacent ball. In this fashion multiple balls could be connected; one ball secured to the next adjacent ball, and so on. The individual short connectors could be seen collectively as a single connective member for the entire toy.

Referring now to FIGS. 6 and 7, a variety of potential designs of the current device may exist and are represented here in alternate exemplary embodiment 400. The exemplary dog log devices 400 comprise a pair of end balls 410 that may optionally be joined by one or a plurality of interior balls 420. From either end of the device the appearance is generally the same, as seen in FIG. 7. In the exemplary dog log design 400, both end balls 410 and the optional interior ball 420 have the appearance of a classic tennis ball. The anchor opening 418 may or may not be visible. The composition and nature of the particular surface of the end ball 410 may effect the degree to which the anchor opening 418 is visible.

Referring now to FIGS. 8 and 9, a variety of potential designs of the current device may exist and are represented here in alternate exemplary embodiment 500. The exemplary dog log devices 500 comprise a pair of end balls 510 that may optionally be joined by one or a plurality of interior balls 520. From either end of the device the appearance is generally the same, as seen in FIG. 9. The anchor opening 518 may or may not be visible. The composition and nature of the particular surface of the end ball 510 may affect the degree to which the anchor opening 518 is visible.

The device of the present disclosure may be claimed as a dog toy device comprising at least two resilient balls, at least two of which are end balls; said end balls having an interior void; a connector member with two ends; each said ball having an opening to permit the connector member to pass through the opening of one said ball and into the opening of another said ball; each said end of said connector member anchored within the void of a respective end ball; and said connector member holding said balls together relatively snugly. The dog toy device as described wherein the connector member is flexible. Additionally, the dog toy device as described wherein said connector member is clothesline cord. The dog toy device as described wherein said connector member is rope. The dog toy device as described wherein said connector member anchored with a knot. The dog toy device as described wherein at least one interior ball intermediate two said end balls, said interior ball having two openings through which the connector member extends. The dog toy device as described may also have at least one interior ball intermediate two said end balls, said interior ball having two openings through which the connector member extends.

Further, the device of the present disclosure may be claimed as a dog toy device comprising at least two resilient balls, at least two said balls having an interior void, a connector member with two ends, each said ball having an opening to permit the connector member to pass through the opening of one said ball and into the opening of another said ball, each said end of said connector member anchored within the interior void of a respective ball, and said connector member holding said balls together relatively snugly. Additionally, the dog toy device as described may further comprise at least one interior ball intermediate said at least two said balls having said interior void, each said interior ball having two openings through which the connector member extends. This device may include that the connector member may be rope or clothesline, and that the connector member may be anchored with a knot.

Further, the device of the present disclosure may be claimed as a dog toy device comprising at least two tennis balls, of which two are end balls, a flexible connector member with two ends, each said end ball having an opening to permit the connector member to pass through the opening of one said end ball and into the opening of another said end ball, and each said end of said connector member anchored within a respective end ball. Additionally, the dog toy device as described may further comprise at least one interior ball intermediate the two said end balls, said interior ball having two openings through which the connector member extends. This device may include that the connector member may be rope or clothesline, and that the connector member may be anchored with a knot.

The foregoing disclosure and description of the invention is illustrative and explanatory thereof. Various changes in the details of the illustrated construction may be made within the scope of the appended claims without departing from the spirit of the invention. The present invention should only be limited by the following claims and their legal equivalents.

I claim:

1. A dog toy device comprising:
   at least two resilient balls, at least two of which are end balls;
   each said ball adjacent to at least one other said ball;
   said end balls having an interior void;
   a connector member with two ends;
   each said ball having an opening to permit the connector member to pass through the opening of one said ball and into the opening of another said ball;
   each said end of said connector member anchored within the void of a respective end ball; and
   said connector member holding said adjacent balls together relatively snugly so as to slightly compress at least one said ball.

2. The dog toy device of claim 1 wherein the connector member is flexible.

3. The dog toy device of claim 2 wherein said connector member is clothesline cord.

4. The dog toy device of claim 2 wherein said connector member is rope.

5. The dog toy device of claim 2 wherein said connector member anchored with a knot.

6. The dog toy device of claim 2 wherein at least one interior ball intermediate two said end balls, said interior ball having two openings through which the connector member extends.

7. The dog toy device of claim 6 wherein said connector member is clothesline cord.

8. The dog toy device of claim 6 wherein said connector member is rope.

9. A dog toy device comprising:
   at least two resilient balls adjacent to each other;
   at least two said balls having an interior void;
   a connector member with two ends;
   each said ball having an opening to permit the connector member to pass through the opening of one said ball and into the opening of another said ball;
   each said end of said connector member anchored within the interior void of a respective ball; and
   said connector member holding said adjacent balls together relatively snugly so as to slightly compress at least one said ball.

10. The dog toy device of claim 9 wherein said connector member anchored with a knot.

11. The dog toy device of claim 9 wherein said connector member is clothesline cord.

12. The dog toy device of claim 9 wherein said connector member is rope.

13. The dog toy device of claim 9 further comprising:
    at least one interior ball intermediate said at least two said balls having said interior void, each said interior ball having two openings through which the connector member extends.

14. The dog toy device of claim 13 wherein said connector member anchored with a knot.

15. The dog toy device of claim 13 wherein said connector member is clothesline cord.

16. The dog toy device of claim 13 wherein said connector member is rope.

17. A dog toy device comprising:
    at least two tennis balls, of which two are end balls;
    each ball secured snugly to an adjacent ball;
    a flexible connector member with two ends;
    each said end ball having an opening to permit the connector member to pass through the opening of one said end ball and into the opening of another said end ball; and
    each said end of said connector member anchored within a respective end ball.

18. The dog toy device of claim 17 wherein at least one interior ball intermediate the two said end balls, said interior ball having two openings through which the connector member extends.

19. The dog toy device of claim 17 wherein said connector member is clothesline cord.

20. The dog toy device of claim 17 wherein said connector member is rope.

* * * * *